United States Patent Office 3,188,312
Patented June 8, 1965

3,188,312
NEW PROCESS FOR THE PREPARATION OF THIOUREA DERIVATIVES
Wolfgang Gündel, Dusseldorf-Oberkassel, and Peter Berth and Wilhelm Jakob Kaiser, Dusseldorf-Holthausen, Germany, assignors to Dehydag, Deutsche Hydrierwerke G.m.b.H., Dusseldorf, Germany, a corporation of Germany
No Drawing. Filed Feb. 24, 1961, Ser. No. 91,331
Claims priority, application Germany, Feb. 27, 1960, D 32,747; Aug. 24, 1960, D 34,088; Oct. 7, 1960, D 34,452
1 Claim. (Cl. 260—247.1)

This invention relates to a process for producing thiourea derivatives substituted on each or both of the nitrogen atoms.

Previous processes of producing substituted thioureas have involved the use of organic solvents or when aqueous solutions were employed, only low molecular weight substituted thioureas could be produced. Use of organic solvents in a technical process is uneconomical because of the recovery operation required and the necessity for costly equipment.

We have now found that technically valuable thiourea derivatives may be obtained in a novel manner by reacting an aqueous solution of an aliphatic ester of an N-mono-substituted dithiocarbamic acid which ester contains a free hydrogen atom attached to the nitrogen atom in the acid moiety and a water-solubilizing group in the alcohol moiety, with ammonia or primary or secondary monoamine or polyamine in the presence of alkalis, preferably alkali metal hydroxides. If desired, it is possible to operate without the addition of alkali metal hydroxides, if a corresponding increase in the amount of ammonia or amine is provided.

It is an object of the invention to produce thiourea derivatives substituted on each or both of the nitrogen atoms by reactions conducted in aqueous media.

It is a further object of this invention to produce thiourea derivatives substituted on each or both of the nitrogen atoms by reacting ammonia or an amine with an aqueous solution of an aliphatic ester of a monosubstituted dithiocarbamic acid, which ester contains a free hydrogen atom attached to the nitrogen atom in the acid moiety and a water-solubilizing group in the alcohol moiety in the presence of an alkali.

These and other objects of the invention will become apparent as the description thereof proceeds.

According to the process of our invention, an aliphatic ester of an N-mono-substituted dithiocarbamic acid, which ester contains a free hydrogen atom attached to the nitrogen atom in the acid moiety and a water-solubilizing group in the alcohol moiety is dissolved in water and reacted at a temperature between about 20° C. and about 100° C. with the stoichiometric amount of a reactant selected from the group consisting of ammonia, primary monoamines, secondary monoamines and polyamines in the presence of an alkaline reactant selected from the group consisting of alkali metal hydroxides, ammonia, primary monoamines, secondary monoamines and polyamines.

In this manner it is possible to obtain mono-, di- or tri-substituted thioureas of the general formula:

$$R-NH-\overset{\overset{S}{\|}}{C}-N\overset{R_1}{\underset{R_2}{\diagdown}}$$

wherein R is (a) an aliphatic hydrocarbon radical which may be unsubstituted or substituted or interrupted by hetero atoms or hetero atom groups or (b) an aromatic radical, and $R_1$ and $R_2$ are hydrogen or hydrocarbon radicals which may be unsubstituted or substituted or also interrupted by hetero atoms or hetero atom groups; these radicals may be identical to or different from each other. R can also represent an alkylene group containing at least three methylene groups, in which case the above formula can be written:

$$\underset{R_2}{\overset{R_1}{\diagdown}}N-\overset{\overset{S}{\|}}{C}-NH-R-NH-\overset{\overset{S}{\|}}{C}-N\underset{R_2}{\overset{R_1}{\diagup}}$$

Specifically, our process results in substituted thioureas of the formula:

$$R-\left[NH-\overset{\overset{S}{\|}}{C}-N\overset{R_1}{\underset{R_2}{\diagdown}}\right]_z$$

wherein z is an integer selected from 1 and 2; R is a radical selected from the group consisting of (A) alkylene having from 3 to 18 carbon atoms and the formula:

$$-\underset{R_3}{\overset{}{C}}H-\left(\underset{R_3}{\overset{}{C}}H\right)_w-\underset{R_3}{\overset{}{C}}H-$$

where $R_3$ represents a member of the group consisting of hydrogen and lower alkyl and w represent an integer selected from 1 to 8, when z is 2 and (B) alkyl having from 1 to 22 carbon atoms, alkenyl having from 3 to 22 carbon atoms, phenyl alkyl having from 7 to 22 carbon atoms, phenyl, naphthyl, alkylphenyl having from 7 to 22 carbon atoms, alkylnaphthyl having from 11 to 22 carbon atoms, nitrophenyl and nitroaminophenyl, when z is 1; and $R_1$ and $R_2$ represent radicals selected from the group consisting of hydrogen, alkyl having from 1 to 22 carbon atoms, alkenyl having from 3 to 22 carbon atoms, hydroxyalkyl having from 2 to 22 carbon atoms, cycloalkyl having from 5 to 6 carbon atoms, alkylcycloalkyl having from 7 to 22 carbon atoms, alkylcycloalkenyl having from 7 to 22 carbon atoms, aminoalkyl having from 2 to 22 carbon atoms, phenyl, naphthyl, aminophenyl, aminonaphthyl, phenylalkyl having from 7 to 22 carbon atoms, alkylphenyl having from 7 to 22 carbon atoms, alkylnaphthyl having from 11 to 22 carbon atoms, alkylaminoalkyl having from 3 to 22 carbon atoms, dialkylaminoalkyl having from 4 to 22 carbon atoms, aminoalkylaminoalkyl having from 4 to 22 carbon atoms, and, when taken together, alkylene having 4 to 5 carbon atoms, alkylaminoalkyl having 4 carbon atoms and alkyloxyalkyl having 4 carbon atoms.

If an alkali metal hydroxide and a primary amine are employed in the process of the invention, the reaction proceeds in accordance with the following schematic reaction formula:

$$R-NH-\overset{\overset{S}{\|}}{C}-SX+NaOH+NH_2-R_1 \longrightarrow$$

$$R-NH-\overset{\overset{S}{\|}}{C}-NH-R_1+NaSX + H_2O$$

where X represents the alcohol moiety containing a water-solubilizing group and R and $R_1$ have the meaning given above.

In accordance with observations, it is certain that under the influence of alkali, which in many cases may be replaced by an additional molecule of amine, an isothiocyanic acid ester (mustard oil) is initially formed in accordance with the following equation:

$$R-NH-\overset{\overset{S}{\|}}{C}-SX + NaOH(\text{or } NH_2-R_1) \longrightarrow$$

$$R-N=C=S + NaSX + H_2O (\text{or } R_1-NH_3^+ \, SX^-)$$

This isothiocyanic acid ester then reacts by addition with the ammonia or the primary or secondary amine in known fashion, and leads to the formation of the mono-, di- or tri-substituted thioureas in accordance with the following equations:

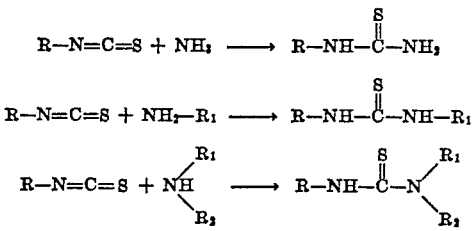

Starting from an aliphatic ester of N-monoaryldithiocarbamic acid which ester contains a free or replaceable hydrogen atom attached to the nitrogen atom in the acid moiety and a water-solubilizing group in the alcohol moiety, it is also possible to employ the above-described process to obtain in very simple fashion and always at low temperatures and in an aqueous medium various mono-, di- or tri-substituted thiourea derivatives having at least one aryl substituent, and that this method offers certain operational advantages especially in those cases in which it was heretofore not possible to forego the isolation of an aryl mustard oil, that is primarily in the preparation of dissimilarly substituted N,N'-di- or N,N',N'- tri-substituted thioureas.

In the preparation of symmetrical N,N'-diarylthioureas with identical aryl substituents the passage through the water-soluble esters of aryldithiocarbamic acids also has advantages over the old process, in which the aromatic amine is refluxed, preferably in alcoholic solution, with carbon disulfide and sodium hydroxide, namely, when the aryl mustard oil which is formed as an intermediate is unstable under the required reaction conditions because of reactive substituents, especially when elevated reaction temperatures are used.

By analogous procedures, it is also possible to obtain alkylene-bis-thioureas wherein both valencies of the terminal nitrogen atoms are occupied by organic radicals. Alkylene-bis-thioureas which may be obtained by the method described below have the general formula:

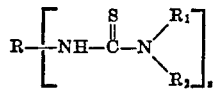

where R represents an alkylene group having from 3 to 18 carbon atoms and the formula:

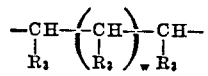

where $R_3$ is a member selected from the group consisting of hydrogen and lower alkyl and $w$ represents an integer selected from 1 to 8.

These products are obtained by reacting an aliphatic diester of alkylene-N,N'-bis-dithiocarbamic acid, which diester contains free or replaceable hydrogen atoms attached to the nitrogen atoms in the acid moiety and a water-solubilizing group in each alcohol moiety, and whose alkylene group has from 3 to 18 carbon atoms and the formula:

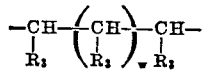

where $R_3$ is a member selected from the group consisting of hydrogen and lower alkyl and $w$ represents an integer selected from 1 to 8, with two mols of ammonia or two mols of a primary or secondary amine in the presence of an alkali.

The observation that alkylene-bis-dithiocarbamic acid esters with water-solubilizing groups in each alcohol moiety, if the nitrogen atoms are separated from each other by a carbon chain having at least three carbon atoms, react according to the principle of the invention and that this reaction makes possible the preparation of alkylene-bis-thioureas, could not have been expected inasmuch as it was found that bis-dithiocarbamic acid esters with water-solubilizing groups in each alcohol moiety, which are derived from 1,2-ethylene diamine, react entirely differently upon being reacted with ammonia or primary or secondary amines in the presence of an alkali even with a considerable excess of the base, because ring closure takes place and 2-mercapto-imidazoline derivatives with a dithiobiuret structure of the general formula:

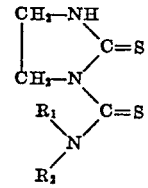

are formed.

The starting aliphatic ester of a mono-substituted dithiocarbamic acid, which ester contains a free hydrogen atom in the acid moiety and a water-solubilizing group in the alcohol moiety can be represented by the formula:

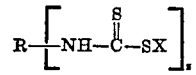

where R and z have the values above and X represents the alcohol moiety containing a water-solubilizing group.

X in the formula shown above may be any desired alkyl radical, provided it is substituted by hydroxyl groups, neutralized carboxyl groups or neutralized sulfonic acid groups. The employment of those radicals which possess acid, salt-forming groups or other water-solubilizing groups makes it possible to perform the process in an aqueous medium even when starting materials used are high molecular weight radicals, ordinarily water-insoluble, whereby the technical performance of the process is substantially facilitated. Since the formation of the starting compounds is very simple and may readily be performed in an aqueous medium, the entire reaction may be carried out in the same vessel and for practical purposes, can be considered a single process step.

The preferred starting compounds have the formula:

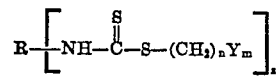

where R and z have the above meanings, $n$ represents an integer from 1 to 4, $m$ represents an integer from 1 to 2 and Y represents a water-solubilizing group selected from the group consisting of —OH, —COONa, and —SO$_3$Na. These compounds are obtained in accordance with known methods, that is, by reacting salts of N-mono-substituted dithiocarbamic acids with substances such as sodium chloroacetate, sodium chloropropionate, ethylene-chlorohydrin, glycerine-monochlorohydrin, sodium bromomethane-sulfonate, sodium bromopropane-sulfonate, 3-bromo-2-oxy-propane-sodium sulfonate or also cyclic anhydrides of hydroxy-carboxylic acids (lactones), such as butyrolactone or propiolactone, or with cyclic anhydrides of hydroxy-sulfonic acids (sultones), such as 1,3-propanesultone or 1,4-butanesultone, etc. Especially, the use of the latter compounds has been found to be particularly advantageous with respect to the yield, because the sultones react so rapidly and completely with the N-mono-substituted dithiocarbamic acid salts in aqueous solution that the alkaline reaction of the still-unreacted dithiocarbamates does not have a cleaving effect upon the ester salt which has already been formed.

According to our invention, these aliphatic esters of N-mono-substituted dithiocarbamic acid are water-soluble and can be further reacted without isolation since the subsequent thiourea formation is carried out in water. If necessary, these intermediate products may be isolated as such by salting out, preferably with sodium chloride, and may be further reacted after their isolation.

Suitable monoamines or polyamines of the formula

for the reaction with the dithiocarbamic acid esters are the primary and secondary amines with 1 to 22 carbon atoms such as alkylamines having from 1 to 22 carbon atoms, for example, ethylamine, butylamine, octylamine, dodecylamine, octadecylamine; dialkylamines having from 2 to 44 carbon atoms, for example, dimethylamine, diethylamine, dioctylamine; alkenylamines having from 3 to 22 carbon atoms, for example, oleylamine; phenylalkylamines having from 7 to 22 carbon atoms, for example, benzylamine; aniline; naphthylamine; hydroxy-alkylamines having from 2 to 22 carbon atoms, for example, ethanolamine; cycloalkylamines having from 5 to 6 carbon atoms, for example, cyclohexylamine; alkylcycloalkylamines having from 7 to 22 carbon atoms, for example, methylcyclohexylamine; alkycycloalkenylamines having from 7 to 22 carbon atoms, for example, naphthenylamine; alkylene diamines having from 2 to 22 carbon atoms, for example, ethylenediamine, propylenediamine, butylenediamine; alkylanilines having from 7 to 22 carbon atoms, aminophenylamines, for example, phenylenediamine; aminonaphthylamines; alkylnaphthylamines having from 11 to 22 carbon atoms; alkylaminoalkylamines having from 3 to 22 carbon atoms, for example, N-ethyl-ethylenediamine; dialkylaminoalkylamines having from 4 to 22 carbon atoms, for example, N,N-diethyl-propylenediamine, N,N - diethyl - ethylenediamine, N,N - dimethyl-propylenediamine; polyalkylamines having from 4 to 22 carbon atoms, for example, diethylenetriamine; piperidine; pyrrolidine; piperazine and morpholine.

The reaction between these starting components takes place smoothly by stirring for several hours, possibly at elevated temperatures of 20 to 100° C., preferably 50 to 60° C. The reaction, however, should be conducted at temperatures of 60° C. or below, if possible. If the amine reactant used in the reaction, such as the high molecular weight amines of the fatty series, is difficulty soluble in water, a solution promoter, such as alcohol, may be added to the mixture without adversely influencing the yield. The substituted thioureas produced in this manner are all so difficulty soluble in water that they separate out of the reaction mixture in crystalline form after a short period of time and may be isolated by filtration.

The dithiocarbamic acid salts utilized in the esterification reaction are formed by the customary methods used in the art of reacting a primary amine of the formula:

$$R-\left[NH_2\right]_z$$

where R and z have the meanings given above with the stoichiometric amount of carbon disulfide and alkali metal hydroxide, such as sodium hydroxide, potassium hydroxide, etc., in an aqueous or aqueous-alcoholic solution. Where R represents an alkylene diamine, the reaction follows the above course, namely, by reacting di-primary alkylenediamines, such as 1,3-propylenediamine, 1,4 - butylenediamine, 1,6 - hexamethylenediamine, 1,10-decamethylenediamine and the like, in aqueous-alcoholic solution with two equivalents of carbon disulfide and two equivalents of alkali metal hydroxide.

It is already known that N-aryl-dithiocarbamic acids transform into aryl mustard oils, accompanied by splitting off hydrogen sulfide, and that these aryl mustard oils may be reacted with amines to form the corresponding thioureas. N-alkyl-dithiocarbamic acids under the same conditions do not lead to the corresponding alkyl mustard oils, which could heretofore be obtained only from alkyl-dithiocarbamates by distillation with heavy metal salts (Gattermann-Wieland, "Die Praxis des Organischen Chemikers," 35th ed. (1953) p. 151). The process according to the invention, which is based upon the surprising cleavage of the N-mono-substituted dithiocarbamic acid esters and does not make it necessary to isolate the mustard oils which are smoothly formed thereby, is capable of very general application and makes it possible to produce in very simple fashion varied types of mono-, di- or tri-substituted thiourea derivatives, and preferably those which have two or three different radicals attached to the nitrogen atom.

The thiourea derivatives obtained with satisfactory yields by the present process, which is further illustrated by the examples below, are useful for various purposes in chemical technology. They may be employed as vulcanization accelerators, corrosion inhibitors in pickling baths and the like, and they are also satisfactory brightening additives for electroplating baths.

The following examples are illustrative of our invention. They are not to be considered as limitative, however, as other expedients known to those skilled in the art can be employed.

EXAMPLE I

*N,N'-di-n-butyl-thiourea*

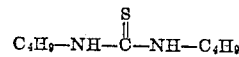

A solution of 59 parts by weight of sodium chloroacetate (0.5 mol) in 120 parts by volume of water was added, while stirring, to an aqueous solution of sodium n-butyl-dithiocarbamate, which had been prepared in known fashion from 250 parts by volume of water, 38 parts by weight of carbon disulfide (0.5 mol), 36.5 parts by weight of n-butylamine (0.5 mol) and 250 parts by volume of 2 N-sodium hydroxide (0.5 mol). After stirring the resulting solution for 2 hours, toward the end at 60° C., a mixture of 80 parts by weight of 25% sodium hydroxide (0.5 mol) and 43.8 parts by weight of n-butylamine (0.5 mol+10% excess) was added thereto. The oil which separated out thereby crystallized after a short period of time. The N,N'-dibutyl-thiourea formed thereby was separated by vacuum filtration, dried and recrystallized from a mixture of benzene and gasoline in a ratio of 1:2. 70 parts by weight of N,N'-di-n-butyl-thiourea having a melting point of 63° to 64° C. were obtained.

As a modification of the method described above, N,N'-di-n-butyl-thiourea may also be prepared as follows: 59 parts by weight of sodium chloroacetate (0.5 mol), dissolved in 120 parts by volume of water, are added to a solution of the n-butylamine salt of n-butyl-dithiocarbamate prepared from 500 parts by volume of water, 38 parts by weight of carbon disulfide (0.5 mol) and 73 parts by weight of n-butylamine (1.0 mol). After stirring the resulting solution for 2 hours, toward the end at 60° C., 160 parts by weight of a 25% solution of sodium hydroxide (1.0 mol) are added thereto, and the mixture is stirred at room temperature until the separation of the N,N'-di-n-butyl-thiourea which crystallizes after a short period of time, is complete.

EXAMPLE II

*N,N'-di-n-octyl-thiourea*

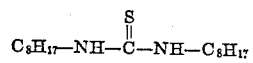

61 parts by weight of 1,3-propanesultone (0.5 mol) were added in small portions to an aqueous suspension of the n-octylamine salt of n-octyl-dithiocarbamate, which had been prepared by adding 129 parts by weight of octylamine (1.0 mol) to a vigorously agitated and cooled mixture of 38 parts by weight of carbon disulfide (0.5 mol) and 500 parts by volume of water, taking care that the temperature did not rise above 50° C. The resulting solution was stirred at this temperature for 1 more hour, whereby it became virtually colorless, and was then allowed to cool. Thereafter, 200 parts by weight of a 20% solution of sodium hydroxide (1.0 mol) were added. A good yield of N,N'-di-n-octyl-thiourea, which was initially oily, separated out and soon thereafter crystallized. After stirring the reaction mixture for 2 more hours, the precipitate was separated by vacuum filtration, dried on clay, and was then recrystallized from 8 times its amount of a mixture of isopropanol and water in a ratio of 4:1. The melting point of the product was 52° to 53° C.

EXAMPLE III

*N,N'-di-n-dodecyl-thiourea*

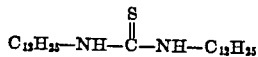

92.5 parts by weight of n-dodecylamine (0.5 mol) were added to a mixture of 38 parts by weight of carbon disulfide (0.5 mol), 100 parts by weight of 20% sodium hydroxide (0.5 mol) and 300 parts by volume of water, while vigorously stirring. The resulting mixture was stirred until all of the carbon disulfide was consumed. To the solution of sodium N-n-dodecyl-dithiocarbamate thus formed, 61 parts by weight of 1,3-propanesultone (0.5 mol) were added in small portions while stirring, and the resulting mixture was heated for about 1 hour, toward the end at 50° C. Upon adding an additional 92.5 parts by weight of n-dodecylamine (0.5 mol) and an additional 100 parts by weight of 20% sodium hydroxide (0.5 mol), the sodium N-n-dodecyl-dithiocarbamyl-S-propane-ω-sulfonate formed thereby was decomposed and the N,N'-di-n-dodecylthiourea thus formed separated out with an excellent yield in crystalline form. The product was separated by vacuum filtration, dried and recrystallized from dimethylformamide or alcohol. Its melting point was 76° to 77° C.

EXAMPLE IV

*N-n-octyl-N'-n-butyl-thiourea*

$$C_8H_{17}-NH-\overset{S}{\underset{\|}{C}}-NH-C_4H_9$$

73 parts by weight of n-butylamine (1.0 mol) were added, while stirring, to an aqueous solution of sodium N-n-octyl-dithiocarbamyl-S-propane-ω-sulfonate, which had been prepared from 38 parts by weight of carbon disulfide (0.5 mol), 64.5 parts by weight of n-octylamine (0.5 mol), 500 parts by volume of water and 100 parts by weight of 20% sodium hydroxide (0.5 mol) and 60.5 parts by weight of 1,3-propanesultone (0.5 mol). The N-n-octyl-N'-n-butyl-thiourea, which separated out soon thereafter with an excellent yield, crystallized in the cold and was filtered off after 1½ hours, dried and recrystallized from a gasoline fraction having a boiling point of 65° to 95° C. Its melting point was 53° to 54° C.

EXAMPLE V

*N-n-dodecyl-N',N'-pentamethylene-thiourea*

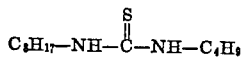

34.1 parts by weight of sodium N-n-dodecyl-dithiocarbamyl-S-ethanoate (0.1 mol), which had been prepared from equimolar amounts of n-dodecylamine, carbon disulfide, sodium hydroxide and sodium chloroacetate, were dissolved in 340 parts by volume of water at 40° C., and to the resulting solution 187 parts by weight of piperidine (0.2 mol+10% excess) were added while stirring. The N-n-dodecyl-N',N'-pentamethylene-thiourea which separated out after a short period of time, initially in an oily state, crystallized in the cold. The crystalline precipitate was separated by vacuum filtration and was recrystallized from 80% alcohol. The yield was virtually quantitative, and the melting point of the product was 59° to 60° C.

EXAMPLE VI

*N-n-dodecyl-N'-ethylol-thiourea*

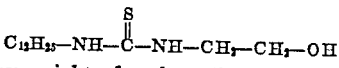

38 parts by weight of carbon disulfide (0.5 mol), were added slowly to a suspension of 92 parts by weight of n-dodecylamine (0.5 mol), 500 parts by volume of water and 100 parts by weight of 20% sodium hydroxide (0.5 mol), and the resulting mixture was stirred until all of the carbon disulfide had reacted. To the solution of sodium N-n-dodecyl-dithiocarbamate thus obtained, 105.5 parts by weight of bromoethane sodium sulfonate (0.5 mol) were added and the mixture was stirred at 50° C. for 2 hours. By adding an additional 100 parts by weight of 20% sodium hydroxide (0.5 mol) and 37 parts by weight of monoethanolamine (0.5 mol) and heating the resulting mixture for 2 hours, first at 50° C. and finally at 90° C., the sodium N-n-dodecyl-dithiocarbamyl-S-ethane-ω-sulfonate was decomposed into sodium mercapto-ethane-sulfonate and N-n-dodecyl-N'-ethylolthiourea, which separated as an oily precipitate and crystallized from a mixture of 5 parts methanol and 2 parts water, it had a melting point of 73° to 74.5° C.

EXAMPLE VII

*N-n-octadecyl-N',N'-diethyl-thiourea*

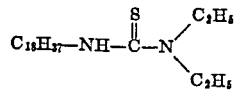

48.9 parts of weight of sodium N-n-octadecyl-dithiocarbamyl-S-propane-ω-sulfonate (0.1 mol), obtained from reacting equimolar amounts of n-octadecylamine, carbon disulfide, sodium hydroxide and 1,3-propanesultone, were suspended in 490 parts by volume of water and 18.5 parts by weight of diethylamine (0.25 mol) were added to this suspension. After stirring the suspension at 50° C. for 5 hours, it was allowed to cool, and the N-n-octadecyl-N', N'-diethyl-thiourea formed thereby was separated by vacuum filtration. The analytically pure compound obtained by recrystallizing the raw product twice from alcohol had a melting point of 65° to 65.5° C.

EXAMPLE VIII

*N,N'-di-(n-octyl-thiocarbamyl)-ethylenediamine*

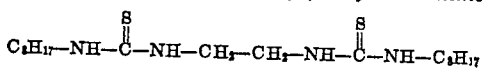

61 parts by weight of 1,3-propanesultone (0.5 mol) were added in small portions to a clear, aqueous solution of sodium N-n-octyl-dithiocarbamate, which had been prepared by introducing 64.5 parts by weight of n-octyl-amine (0.5 mol) to a vigorously agitated mixture of 38 parts by weight of carbon disulfide (0.5 mol), 20 parts by weight of caustic soda (0.5 mol) and 300 parts by volume of water. After stirring the resulting mixture for ½ hour at 35° C., 80 parts by weight of 25% sodium hydroxide (0.5 mol) and 15.5 parts by weight of ethylenediamine (0.25) mol) were added thereto. The N,N'-di-(n-octylthiocarbamyl)-ethylenediamine which soon thereafter separated in crystalline form, was separated by vacuum filtration after stirring the reaction mixture for 2 hours, and the product was purified by recrystallization from methanol. The yield was 31% of theory and the melting point of the analytically pure compound was 129° C.

EXAMPLE IX

*N,N'-di-(n-butyl-thiocarbamyl)-ethylenediamine*

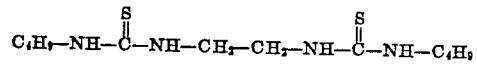

By following the procedure described in the preceding example in close analogy, but using 36.5 parts by weight of n-butylamine (0.5 mol) in place of n-octylamine, N,N'-di- (n-butyl-thiocarbamyl)ethylenediamine was obtained which solidified in crystalline form upon cooling and recrystallized from isopropanol, had a melting point of 133° to 135° C.

EXAMPLE X

*N,N'-di-(n-butyl-thiocarbamyl)-piperazine*

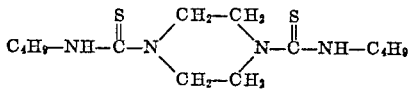

55.3 parts by weight of glycerine-α-chlorohydrin (0.5 mol) were added to a solution of sodium N-n-butyl-dithiocarbamate which had been prepared in customary fashion from 38 parts by weight of carbon disulfide (0.5 mol), 36.5 parts by weight of n-butylamine (0.5 mol), 100 parts by weight of 20% sodium hydroxide (0.5 mol) and 310 parts by volume of water. The resulting mixture was stirred at 50° C. for 2 hours, whereby the initially clear solution became turbid. Thereafter, 100 parts by weight of 20% sodium hydroxide (0.5 mol) and 48.5 parts by weight of piperazine hexahydrate (0.25 mol) were added to this mixture, whereby the solution temporarily became clear until the N,N'-di-(n-butyl-thiocarbamyl)-piperazine formed by the reaction separated out. The reaction mixture was stirred for 2 hours and the precipitate was then separated by vacuum filtration. 45.6 parts by weight of the reaction product were obtained. It was recrystallized from alcohol. The melting point was 173° to 175° C. The yield was about 29% of theory.

EXAMPLE XI

*N-n-octyl-N'-phenyl-thiourea*

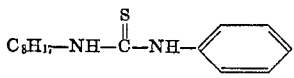

A solution of sodium N-n-octyl-dithiocarbamate was prepared by the previously described method from 64.5 parts by weight of n-octylamine (0.5 mol), 38 parts by weight of carbon disulfide (0.5 mol), 100 parts by weight of 20% sodium hydroxide (0.5 mol) and 500 parts by weight of water. The sodium N-n-octyl-dithiocarbamate was transformed into sodium N-n-octyl-dithiocarbamyl-S-propane-ω-sulfonate by adding 61 parts by weight of 1,3-propanesultone (0.5 mol) to the solution. Upon adding 100 parts by weight of 20% sodium hydroxide (0.5 mol) and 46.5 parts by weight of aniline (0.5 mol) the sodium N-n-octyl-dithiocarbamyl-S-propane-ω-sulfonate was decomposed, yielding N-n-octyl-N'-phenyl-thiourea which, upon being placed on ice, crystallized and was obtained with a good yield. After recrystallizing it once from a mixture of methanol and water in a ratio of 4:1, it had a melting point of 50° to 52°.

EXAMPLE XII

*N-n-decyl-thiourea*

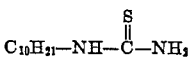

By decomposing sodium N-n-decyl-dithiocarbamyl-S-propane-ω-sulfonate, dissolved in six times its amount of water, in the presence of an excess of ammonia with an equivalent amount of sodium hydroxide, n-decyl-thiourea was obtained with an excellent yield, which recrystallized from gasoline, had a melting point of 98° to 99° C.

EXAMPLE XIII

*Ethyl-thiourea*

An aqueous solution of 71.5 parts by weight of sodium N-ethyl-dithiocarbamate (0.5 mol), prepared from equimolar amounts of ethylamine, carbon disulfide and sodium hydroxide, was admixed dropwise with 59 parts by weight of sodium chloroacetate (0.5 mol) in 150 parts by volume of water. After stirring the mixture for a short period of time, the dithiourethane formed thereby was decomposed by heating with 35 parts by weight of 25% ammonia (0.5 mol). After cooling, the ethyl-thiourea, having a melting point of 143° to 145° C., crystallized.

EXAMPLE XIV

*Butyl-thiourea*

61 parts by volume of molten propanesultone-1,3 (0.5 mol) were added to an aqueous solution of sodium N-n-butyl-dithiocarbamate, which had been prepared in known fashion from 250 parts by volume of water, 38 parts by weight of carbon disulfide (0.5 mol), 36.5 parts by weight of n-butylamine (0.5 mol) and 250 parts by volume of 2 N-sodium hydroxide (0.5 mol). The resulting mixture was stirred for one hour, and then it was heated for thirty minutes with 68 parts by weight of 25% ammonia (1.0 mol). The n-butyl-thiourea formed thereby was separated by vacuum filtration and was recrystallized from water. Yield: 55 grams (83% of theory) of n-butyl-thiourea having a melting point of 79° C. The n-butyl-thiourea may also be prepared by reacting the above solution of sodium N-n-butyl-dithiocarbamate with 43 parts by weight of propiolactone (0.5 mol) and decomposing the dithiourethane formed thereby by heating it with 68 parts by weight of 25% ammonia (1.0 mol) until the crystalline n-butyl-thiourea separates out.

EXAMPLE XV

*Benzyl-thiourea*

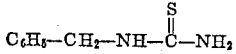

53.5 parts by weight of benzylamine (0.5 mol) were added dropwise, while stirring, to a mixture of 38 parts by weight of carbon disulfide (0.5 mol), 100 parts by weight of 20% sodium hydroxide (0.5 mol) and 250 parts by volume of water. When the resulting solution became clear, 50 parts by weight of propiolactone (0.5 mol) were added dropwise thereto, also accompanied by stirring, and after all of the propiolactone had been added, the reaction mixture was heated for one hour at 100° C. with 68 parts by weight of 25% ammonia (1.0 mol). After cooling, the reaction mixture was vacuum filtered. After recrystallization from aqueous ethanol, the benzyl-thiourea formed by the reaction had a melting point of 160° to 161° C. The yield was 75 parts by weight (90% of theory).

EXAMPLE XVI

*N,N'-di-(n-butyl-thiocarbamyl)-propylenediamine-1,3*

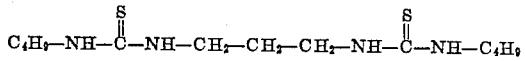

14.8 parts by weight of 1,3-propylenediamine (0.2 mol) are slowly added, while stirring, to a mixture of 30.4 parts by weight of carbon disulfide (0.4 mol), 80 parts by weight of 20% sodium hydroxide (0.4 mol) and 150 parts by volume of water, and the resulting mixture is stirred at room temperature until the solution becomes clear. To the solution of sodium propylene-1,3-bis-N,N'-dithiocarbamate thus obtained, 49 parts by weight of 1,3-propanesultone (0.4 mol) are added in small portions. After stirring the solution of sodium propylene-1,3-bis-N,N' - dithiocarbamyl-S-propane-ω-sulfonate thus obtained for one hour, 49.2 parts by weight of n-butyl-amine (0.4 mol) and the equivalent amount of 20% sodium hydroxide are added thereto. The N,N'-di-(n-butyl-thiocarbamyl)-propylenediamine-1,3 separated out in crystalline form after a short period of time and, after stirring the mixture for several hours, the product is isolated and, for purification, is recrystallized from seven times its amount of ethyl acetate. 37 parts by weight of the product are obtained, which corresponds to a yield of 61% of theory. The product had a melting point of 124°–125° C.

The same compound was obtained with approximately the same yield when 46.7 parts by weight of sodium monochloroacetate (0.4 mol) was used in place of 1,3-propanesultone, and the sodium propylene-1,3-bis-N,N'-dithiocarbamyl-ethanoate thus formed is reacted with 20% sodium hydroxide and n-butylamine in the manner described above.

EXAMPLE XVII

N,N'-di-(diethyl-thiocarbamyl)-propylenediamine-1,3

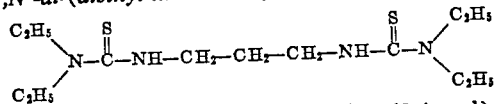

29.2 parts by weight of diethylamine (0.4 mol) and 80 parts by weight of a 20% solution of sodium hydroxide (0.4 mol) were added, accompanied by stirring, to an aqueous solution of sodium propylene-1,3-bis-N,N'-dithiocarbamyl-S-propane-ω-sulfonate (0.2 mol) which was prepared in a manner similar to that described in Example XVI. The N,N'-di-(diethylthiocarbamyl)-propylenediamine-1,3 which soon separated out in crystalline form was isolated and was recrystallized from seven times its amount of a mixture of two parts methanol and one part water. The product had a melting point of 88°–89° C.

EXAMPLE XVIII

N,N'-di-(cyclohexyl-thiocarbamyl)-propylenediamine-1,3

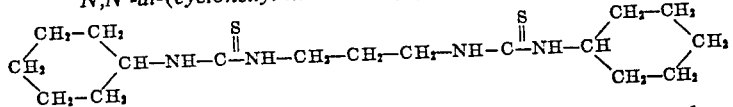

By working in close analogy to the methods described in examples XVI and XVII, that is by reacting a solution of 0.2 mol of sodium propylene-1,3-bis-N,N'-dithiocarbamyl-S-propane-ω-sulfonate in the presence of 80 parts by weight of 20% sodium hydroxide (0.4 mol) with 39.6 parts by weight of cyclohexylamine (0.4 mol), the N,N' - di - (cyclohexylthiocarbamyl)-propylenediamine-1,3, having the structural formula shown above was obtained with a yield of about 80%. By recrystallization from twenty-five times its amount of methanol, the reaction product was obtained analytically pure. It had a melting point of 189°–189.5° C.

EXAMPLE XIX

N,N'-di-(benzyl-thiocarbamyl)-propylenediamine-1,3

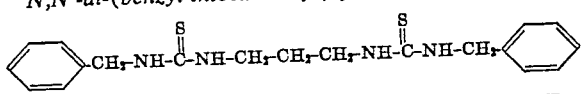

Using a procedure analogous to that described in Example XVIII, but using 42.8 parts by weight of benzylamine (0.4 mol) in place of cyclohexylamine, and working up the reaction mixture in the same manner, an about 73% yield of N,N'-di-(benzyl-thiocarbamyl)-propylenediamine-1,3 was obtained which, recrystallized from five times its amount of alcohol, had a melting point of 113°–114° C.

EXAMPLE XX

N,N,N',N'-di-(pentamethylene-thiocarbamyl)-propylenediamine-1,3

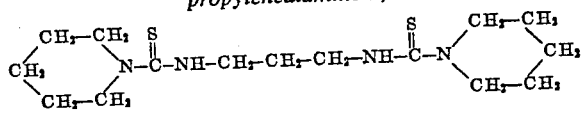

Using a procedure analogous to that described in Examples XVI to XIX, 34.0 parts by weight of piperidine (0.4 mol) yielded N,N,N',N'-di-(pentamethylene-thiocarbamyl)-propylenediamine-1,3 which was isolated in the usual manner. Recrystallized from four times its amount of methanol, it had a melting point of 107°–108° C.

EXAMPLE XXI

N,N'-di-(n-butyl-thiocarbamyl)-hexamethylenediamine-1-6

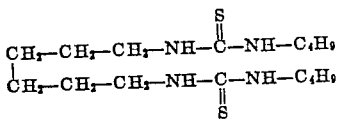

23.2 parts by weight of 1,6-hexamethylenediamine (0.2 mol) were introduced in small portions into a mixture of 30.4 parts by weight of carbon disulfide (0.4 mol), 80 parts by weight of 20% sodium hydroxide (0.4 mol) and 150 parts by weight of water, and the resulting mixture was stirred until all of the carbon disulfide had reacted. If necessary, the solution was filtered and then was admixed with 49 parts by weight of 1,3-propanesultone (0.4 mol), stirred for one hour, and was finally admixed with 29.2 parts by weight of n-butylamine (0.4 mol). After adding 80 parts by weight of 20% sodium hydroxide (0.4 mol) the N,N'-di-(n-butyl-thiocarbamyl)-hexamethylenediamine-1,6 separated out in ample quantity and in crystalline form. It was obtained analytically pure by reprecipitation from methanol or isopropanol, whereupon it had a melting point of 90°–91° C.

EXAMPLE XXII

N,N'di-(dimethyl-thiocarbamyl)-hexamethylenediamine-1,6

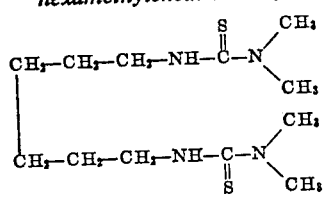

Using the procedure described in Example XXI, an aqueous solution of sodium hexamethylene-1,6-bis-N,N'-dithiocarbamyl-S-propane-ω-sulfonate was prepared from two equivalents of carbon disulfide, two equivalents of sodium hydroxide, one equivalent of 1,6-hexamethylenediamine and two equivalents of 1,3-propanesultone. To this solution, double the amount of a concentrated sodium chloride solution was added at about 50° C. The following day, the salt which had crystallized out in ample quantity was isolated and was dried while avoiding overheating.

Taking into consideration the content of sodium chloride, an approximately 30% aqueous solution, containing 111.2 gm of this salt (0.2 mol) is prepared, to which 55 parts by weight of dimethylamine (0.4 mol) and 80 parts by weight of 20% sodium hydroxide (0.4 mol) are added while stirring. N,N'-di-(dimethyl-thiocarbamyl)-hexamethylene-diamine-1,6 separated out in crystalline form with an excellent yield. It was recrystallized from three to four times its amount of isopropanol or six times its amount of benzene, whereupon it was obtained in pure form and had a melting point of 115.5°–116° C.

EXAMPLE XXIII

*N-phenyl-N'-benzyl-thiourea*

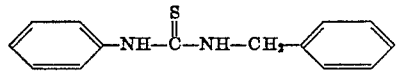

48.8 parts by weight of 1,3-propanesultone (0.4 mol) were added in small portions to a solution of sodium N-phenyl-dithiocarbamate (0.4 mol), which was prepared in the usual manner from 37.2 parts by weight of aniline (0.4 mol), 30.4 parts by weight of carbon disulfide (0.4 mol), 16 parts by weight of caustic soda (0.4 mol) and 160 parts by volume of water, whereby the temperature rose to 30° C. After stirring the mixture for one hour, a small amount of solid component was filtered off, and 42.8 parts by weight of benzylamine (0.4 mol) and 80 parts by weight of 20% sodium hydroxide (0.4 mol) were added to the solution. The N-phenyl-N'-benzyl-thiourea formed with excellent yields was separated by vacuum filtration and was recrystallized from fifteen times its amount of methanol. It had a melting point of 153°–154° C.

EXAMPLE XXIV

*N-phenyl-N'-cyclohexyl-thiourea*

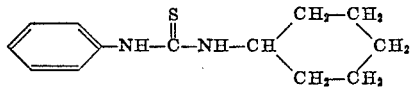

By following a procedure closely analogous to that described in the previous example, but using 39.6 parts by weight of cyclohexylamine (0.4 mol) in place of benzylamine, and working up the reaction mixture in the same manner, N-phenyl-N'-cyclohexyl-thiourea having a melting point of 146–147° C. was obtained with excellent yields; the product may be recrystallized from seven times its amount of methanol.

EXAMPLE XXV

*N-phenyl-N'-(3-diethylamino-propyl)-thiourea*

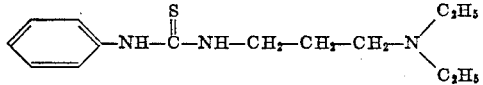

52.0 parts by weight of 3-diethylamino-propylamine (0.4 mol) and 80 parts by weight of 20% sodium hydroxide (0.4 mol) were added to a solution of sodium N-phenyl-dithiocarbamyl-S-propane-ω-sulfonate (0.4 mol) which was prepared in the manner described in Example XXIII. The N-phenyl-N'-(3-diethylamino-propyl)-thiourea which separated out in crystalline form after a short period of time was isolated by filtration after stirring the reaction mixture for one hour at room temperature, and was then recrystallized from eight times its amount of 75% alcohol. The compound has a melting point of 117°–118° C. and forms a clear solution in dilute acids.

EXAMPLE XXVI

*N-phenyl-N'-(2-diethylamino-ethyl)-thiourea*

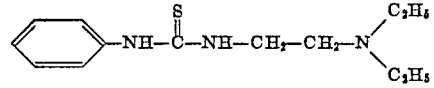

46.5 parts by weight of 2-diethylamino-ethylamine (0.4 mol) and 80 parts by weight of 20% sodium hydroxide (0.4 mol) were added to a solution of sodium N-phenyl-dithiocarbamyl-S-propane-ω-sulfonate (0.4 mol) which had been prepared in the manner described in Example XXIII and had been freed from small amounts of simultaneously formed diphenylurea by filtration. The reaction mixture was stirred for several hours during which the crystalline product separated out. The product was filtered off, dried and extracted with isopropanol. The N-phenyl-N'-(2-diethylamino-ethyl)-thiourea remaining in the filtrate was recovered by evaporation and crystallization. Its melting point was 85°–86.5° C.

EXAMPLE XXVII

*N-phenyl-N'-(3-dimethylamino-propyl)-thiourea*

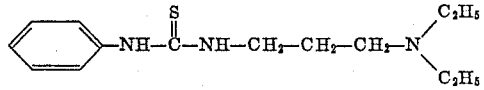

By following a procedure analogous to that described in Example XXVI, but using 40.8 parts by weight of 3-dimethylamino-propylamine (0.4 mol) in place of 2-diethylamino-ethylamine, and working up the reaction mixture in the same manner, N-phenyl-N'-(3-dimethylamino-propyl)-thiourea having a melting point of 113°–115° C. was obtained.

EXAMPLE XXVIII

*N-(3-nitrophenyl)-thiourea*

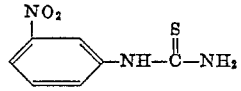

18.8 parts by weight of chloroacetic acid (0.2 mol) dissolved in water were added dropwise to a solution of sodium N-(3-nitrophenyl)-dithiocarbamate (0.2 mol) which had been prepared from 27.6 parts by weight of 3-nitroaniline (0.2 mol), 15.2 parts by weight carbon disulfide (0.2 mol), 8 parts by weight of caustic soda (0.2 mol) and 80 parts by volume of water, whereby the temperature rose to about 40° C. After stirring the reaction mixture for one hour it was filtered and the filtrate was heated for a short time with 15 parts by weight of 25% ammonia (0.20 mol+10% excess) and 40 parts by weight of 20% sodium hydroxide (0.2 mol). The N-(3-nitrophenyl)-thiourea crystallized out with a good yield in the form of lemon yellow needles which, after recrystallization from ethanol, had a melting point of 157°–158° C.

EXAMPLE XXIX

*N-(3-nitro-4-aminophenyl)-thiourea*

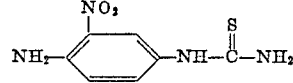

18.8 parts by weight of chloroacetic acid (0.2 mol) in aqueous solution were added dropwise to a solution of sodium N-(3-nitro-4-aminophenyl)-dithiocarbamate (0.2 mol) which was prepared from 30.6 parts by weight of nitrophenylenediamine-1,4 (0.2 mol), 15.2 parts by weight of carbon disulfide (0.2 mol), 8 parts by weight of caustic soda (0.2 mol) and 80 parts by volume of water. After stirring this mixture for a short period of time 15 parts by weight of 25% ammonia (0.20 mol+10% excess) and 40 parts by weigh of 20% sodium hydroxide (0.2 mol) were added. The N-(3-nitro-4-aminophenyl)-thiourea crystallized out after a short period of heating. After recrystallization from a mixture of dimethylformamide, ethanol and water, it had a melting point of 200° C. (decomposition).

EXAMPLE XXX

*N-phenyl-N,N'-dimethyl-thiourea*

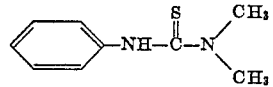

A solution of sodium N-phenyl-dithiocarbamyl-S-propane-ω-sulfonate (0.2 mol), prepared in accordance with Example XXIII, was heated for a short period of time together with 23 parts by weight of a 40% dimethylamine solution (0.2 mol) and 40 parts by weight of 20% sodium hydroxide (0.2 mol). After cooling, the N-phenyl-N',N'-dimethyl-thiourea crystallized out. Upon recrystallization from ethanol it had a melting point of 133°–134° C.

EXAMPLE XXXI

N,N'-diphenyl-thiourea

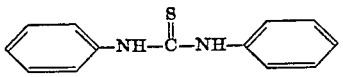

A solution of sodium N-phenyl-dithiocarbamyl-S-propane-ω-sulfonate (0.2 mol), obtained according to Example XXII, was heated together with 18.6 parts by weight of aniline (0.2 mol) and 40 parts by weight of 20% sodium hydroxide (0.2 mol). The N,N'-diphenyl-thiourea crystallized out with very good yields. After recrystallization from ethanol, it had a melting point of 153°–155° C.

The above examples disclose many of the embodiments of our invention. It is to be understood that other embodiments such as utilization of other reactants, alkali metal hydroxides, etc., known to those skilled in the art may be employed without departing from the spirit of the invention or the scope of the appended claim.

We claim:

The process of producing substituted thioureas of the formula:

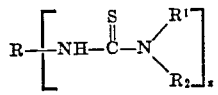

wherein $z$ is an integer selected from 1 and 2; R is a radical selected from the group consisting of (A) when $z$ is 2, alkylene having from 3 to 18 carbon atoms of the formula

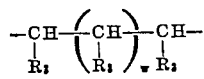

where $R_3$ represents a member of the group consisting of hydrogen and lower alkyl and $w$ represents an integer selected from 1 to 8, and (B) when $z$ is 1 alkyl having from 1 to 22 carbon atoms, alkenyl having from 3 to 22 carbon atoms, phenyl alkyl having from 7 to 22 carbon atoms, phenyl, naphthyl, alkylphenyl having from 7 to 22 carbon atoms, alkylnaphthyl having from 11 to 22 carbon atoms, nitrophenyl and nitroaminophenyl, and $R_1$ and $R_2$ represent radicals selected from the group consisting of hydrogen, alkyl having from 1 to 22 carbon atoms, alkenyl having from 3 to 22 carbon atoms, hydroxyalkyl having from 2 to 22 carbon atoms, cycloalkyl having from 5 to 6 carbon atoms, alkylcycloalkyl having from 7 to 22 carbon atoms, alkylcycloalkenyl having from 7 to 22 carbon atoms, aminoalkyl having from 2 to 22 carbon atoms, phenyl, naphthyl, aminophenyl, aminonaphthyl, phenylalkyl having from 7 to 22 carbon atoms, alkylphenyl having from 7 to 22 carbon atoms, alkylnaphthyl having from 11 to 22 carbon atoms, alkylaminoalkyl having from 3 to 22 carbon atoms, dialkylaminoalkyl having from 4 to 22 carbon atoms, aminoalkylaminoalkyl having from 4 to 22 carbon atoms, and, when taken together, alkylene having 4 to 5 carbon atoms, ethylaminoethyl and ethyloxyethyl which comprises the steps of reacting a compound having the formula:

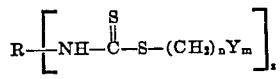

where R and $z$ have the above meanings, $n$ represents an integer from 1 to 4, $m$ represents an integer from 1 to 2 and Y represents a water-solubilizing group selected from the group consisting of hydroxyl, carboxyl and sulfo groups, dissolved in an aqueous solution with the stoichiometric amount of a compound having the formula

where $R_1$ and $R_2$ have the above meanings in the presence of an alkaline reactant selected from the group consisting of alkali metal hydroxides and

where $R_1$ and $R_2$ have the above meanings at a temperature between about 20° C. and about 100° C. and recovering said substituted thioureas.

References Cited by the Examiner

UNITED STATES PATENTS

| | | | |
|---|---|---|---|
| 2,254,136 | 8/41 | Buck et al. | 260—552 |
| 2,849,351 | 8/58 | Gundel et al. | 260—513 |
| 2,891,065 | 6/59 | Gundel et al. | 260—455 |
| 2,907,786 | 10/59 | Gundel et al. | 260—455 |

FOREIGN PATENTS 161,232   7/53   Australia.

OTHER REFERENCES

Bull. Soc. Chim., France (January–June 1950), complete article at pages 43–65, page 58 relied on (Chabriers et al., authors).

Delepine: Annales de Chemie et de Physique, vol. 29 (1903), pages 102–4.

IRVING MARCUS, *Primary Examiner.*

D. T. McCUTCHEN, *Examiner.*